J. E. PAULSON.
POTATO CUTTER AND PLANTER.
APPLICATION FILED SEPT. 27, 1919.

1,406,679.

Patented Feb. 14, 1922.
2 SHEETS—SHEET 1.

INVENTOR: John E. Paulson.
BY his ATTORNEY: A. M. Carlsen.

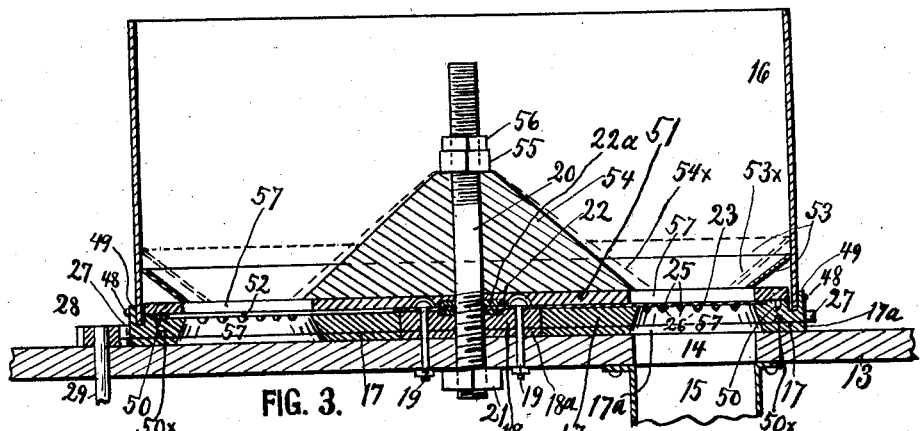
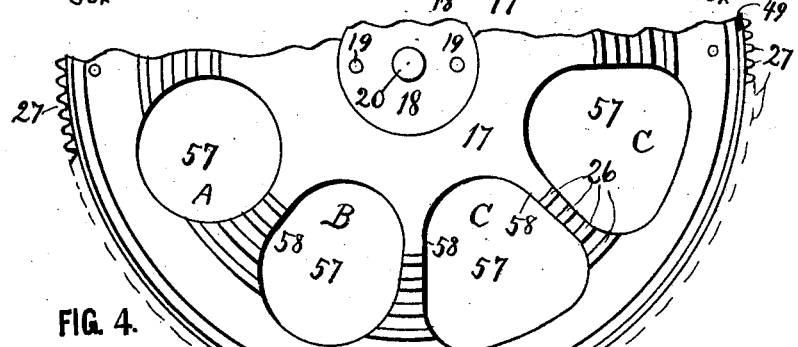
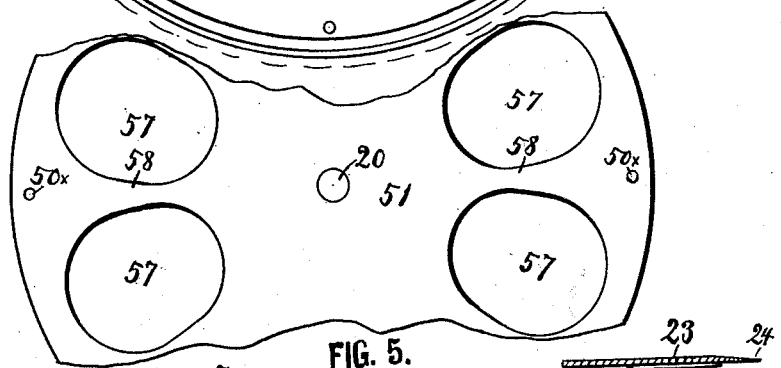
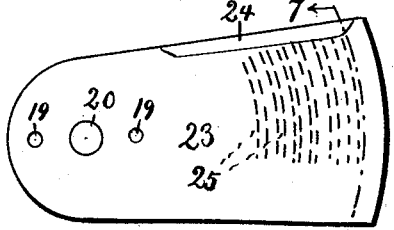

UNITED STATES PATENT OFFICE.

JOHN E. PAULSON, OF MINNEAPOLIS, MINNESOTA.

POTATO CUTTER AND PLANTER.

1,406,679.  Specification of Letters Patent.  Patented Feb. 14, 1922.

Application filed September 27, 1919. Serial No. 327,411.

*To all whom it may concern:*

Be it known that I, JOHN E. PAULSON, a citizen of the United States, residing at Minneapolis, in the county of Hennepin and State of Minnesota, have invented a new and useful Potato Cutter and Planter, of which the following is a specification.

This invention relates to machines for cutting and planting potatoes; and the object is to provide an improved machine of said kind, with rotary hoppers and means for operating on potatoes of different sizes.

In the accompanying drawings—

Figure 1:
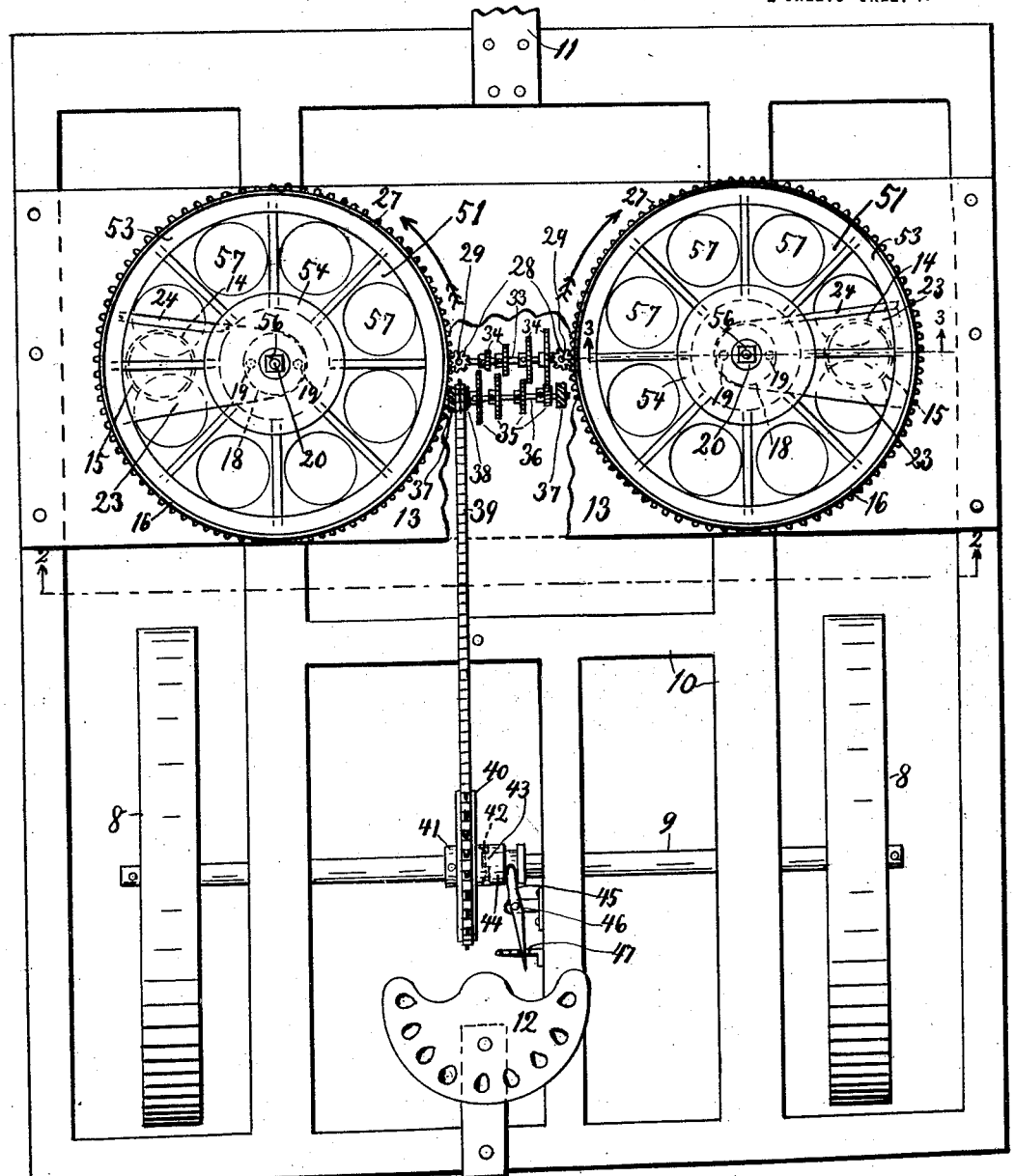
Figure 2:
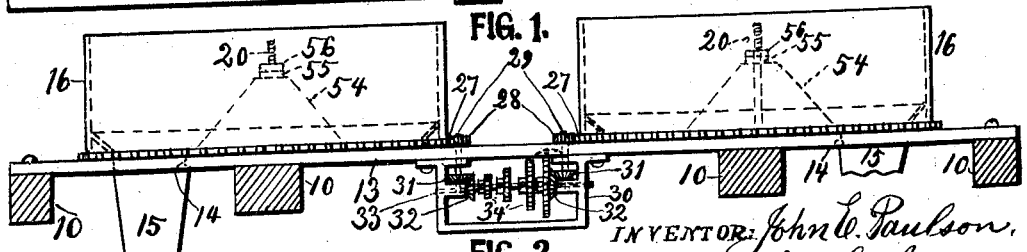

Fig. 1 is a plan view of a potato cutting and planting machine embodying my improvements. Fig. 2 is a section on the line 2—2 in Fig. 1 with the shaft 36 and its gears omitted. Fig. 3 is an enlarged section on the line 3—3 in Fig. 1 with the hopper turned into position for dropping potatoes through one of its bottom apertures into the seeding tube below the rigid hopper base. Fig. 4 is a top view of the main member, 17, of the hopper bottom. Fig. 5 is a top view of a secondary or upper member of the hopper bottom. Fig. 6 is a top view of the blade that cuts each potato in two before the planting. Fig. 7 is a section on the line 7—7 in Fig. 6.

Referring to the drawings by reference numerals, 8 designates the usual supporting wheels, 9 the axle and 10 the main frame of the machine. Said frame may have a draft pole 11 and a seat 12. Secured upon the front part of the frame is a platform or base, 13, having two seed dropping apertures, 14, with depending seed dropping tubes 15, carried in linear position forward of each ground wheel 8, so that said wheels will cover the planted potatoes after they are dropped into a furrow made by any kind of suitable furrow-opener (not shown).

Adjacent each seed tube 15 is mounted upon the base a hopper 16; both hoppers being alike I need not describe more than one of them. Each hopper has a bottom 17 rotatable on a central hub or boss 18, which is fixed on the base 13 by bolts 19 and by a post 20 having a nut 21 below the base and a thinner nut 22 sunk into the top of the base. Said bolts 19 and a nut 22$^a$ hold also a radial potato-cutting blade 23, having a sharp edge 24, and ribs 25 at its underside, the bottom 17 having clearness 26 for said ribs, (see Figs. 3 and 4).

Each hopper bottom has its periphery provided with teeth 27, which are engaged by pinions 28 fixed on vertical shafts 29, (see Fig. 2) which are journaled in a frame 30 fixed up under the base 13 and are provided with bevel gears 31, driven by bevel gears 32 fixed on a horizontal shaft 33. On the latter shaft are also fixed several gears 34 of different diameters and arranged to be engaged one at a time by one of several differently sized gears, 35, which are adjustably secured by set-screws upon a shaft 36. The latter shaft is journaled in suitable bearings 37 and provided with sprocket 38, which is driven by a chain 39 and a sprocket 40; the latter is rotatable on the axle 9, between two collars, 41, 42, and its hub is provided with clutch teeth 43, adapted to be engaged by a clutch member 44, which is slidably keyed on the axle and moved by a shifter 45, fulcrumed at 46 and engageable with a notched bracket 47.

In Figs. 3 and 4 is shown that the sheet metal cylinder or body of each hopper may be secured by screws or similar means, 48, to a peripheral rim 49 of the bottom or gear wheel 17, though several lugs may be used instead of a continuous rim.

Resting upon the main bottom member 17 and engaging it by dowel pins 50, is a secondary bottom member, 51, having a central hole rotatable on the post 20; a space 52 (shown to the left in Fig. 3) is thus provided between the two bottom members for the blade 23; said space may be formed by an annular cavity in either member. Upon said upper member rests a flaring ring 53 and a truncated cone 54, the latter is retained upon the post 20 by a nut 55 and a jam-nut 56. Between said ring and cone the potatoes placed in the hopper are guided down into apertures or pockets 57 which are formed in the bottom members 17 and 51 in registering position above each other, and which may be of any desired form, as indicated at A, B and C in Fig. 4, with intervening radial arms 58 by which potatoes are moved along upon the base.

In the operation of the machine, if the potatoes to be planted are extra small, the ring 53 and cone 54 may be removed and replaced by larger ones, like 53$^x$ and 54$^x$, and if the potatoes are extra large a third bottom member, 17$^a$, similar to the member 51, is placed upon the base and with its dowel pins engaged in the cavities 50ˣ in Fig. 3. Such third bottom member is to increase the height of the spokes 58 and the cutter blade so that even large potatoes will be cut in two practically equal parts. Or, very large potatoes may be cut in three parts or slices by removing the bottom section 17ᵃ and its hub section, 18ᵃ.

When the machine is in operation with potatoes in the hoppers, each radial arm 58 causes one potato to be cut by the blade and passed one half of it in under the blade and into the seeding tube, the ribs 25 preventing it from sticking to the blade; the other half of that potato is moved across the top of the blade and dropped into the wheel or bottom pocket emerging from under the blade, and is thus carried along until it reaches the blade again, when it is either cut again or it passes underneath it and is dropped into the tube and leaves the pocket empty for moving a whole potato to the blade at the next rotation of the hopper. The distance between the hills depends on which one of the gears 35 is moved into mesh. The distance between the rows is determined by the distance between the planting tubes. And if the machine is to be driven idle, the clutch member 44 is moved out of engagement with the member 43.

What I claim is:

1. In a potato planting machine, of the type having a supported frame, and a potato dropping tube depending from said frame, a flat base fixed on the frame and having an aperture leading into the tube, a cylindrical hopper mounted to rotate upon the base and having its bottom skeletoned into radial arms for moving potatoes into the dropping tube, a cutter blade spaced above and fixed to the base radially of the hopper across the top of the tube; said bottom composed of a lower main member moving below the blade and an upper member moving close above the blade, and means for rotating said hopper and its bottom.

2. The structure specified in claim 1, and means within the hopper for changing the size of the opening which admits the potatoes to pass downward into the spaces in the bottom.

3. The structure specified in claim 1, and means for increasing the height of the bottom member below the cutting blade.

4. The structure specified in claim 1, said blade having at its underside rigid ribs and said radial portions of the bottom having clearings for said ribs.

In testimony whereof I affix my signature.

JOHN E. PAULSON.